US009721440B1

(12) United States Patent
Lin

(10) Patent No.: US 9,721,440 B1
(45) Date of Patent: Aug. 1, 2017

(54) POINT-OF-SALE SYSTEM WITH REPLACEABLE PRINTER

(71) Applicant: FLYTECH TECHNOLOGY CO., LTD, Taipei (TW)

(72) Inventor: Chiung-Chi Lin, Taipei (TW)

(73) Assignee: FLYTECH TECHNOLOGY CO., LTD, Taipei (TW)

( * ) Notice: Subject to any disclaimer, the term of this patent is extended or adjusted under 35 U.S.C. 154(b) by 0 days.

(21) Appl. No.: 15/196,752

(22) Filed: Jun. 29, 2016

(30) Foreign Application Priority Data

Apr. 1, 2016 (TW) .............................. 105204616 U

(51) Int. Cl.
| | | |
|---|---|---|
| *G06K 19/06* | (2006.01) | |
| *G07G 5/00* | (2006.01) | |
| *G06Q 20/20* | (2012.01) | |
| *G07G 1/00* | (2006.01) | |

(52) U.S. Cl.
CPC ............. *G07G 5/00* (2013.01); *G06Q 20/209* (2013.01); *G07G 1/0018* (2013.01)

(58) Field of Classification Search
CPC .......... G07G 1/0018; G07G 5/00; G07G 1/12; G07G 1/0027; G07G 1/01; G07G 1/14; G06Q 20/20; G06Q 30/06; G06Q 20/202; G06Q 10/087; G06K 15/02; G06K 15/4045; G06K 7/10752
USPC ................................................. 235/492, 379
See application file for complete search history.

(56) References Cited

U.S. PATENT DOCUMENTS

| | | | | |
|---|---|---|---|---|
| 5,844,219 A | * | 12/1998 | Wallner ................. | B41J 15/042 235/375 |
| 5,969,319 A | * | 10/1999 | Wallner ................... | G07G 5/00 235/375 |
| 5,995,375 A | * | 11/1999 | Miyazawa .......... | H01M 2/1044 307/64 |
| 6,003,008 A | * | 12/1999 | Postrel .................... | G06F 1/183 235/381 |
| 2006/0273172 A1 | * | 12/2006 | Helez ................... | G07G 1/0018 235/439 |
| 2007/0059074 A1 | * | 3/2007 | Yoshioka ................... | B41J 2/32 400/120.16 |
| 2007/0288322 A1 | * | 12/2007 | Watanabe .......... | G06Q 20/0453 705/21 |
| 2017/0039539 A1 | * | 2/2017 | Singgih ................ | G06Q 20/209 |

* cited by examiner

*Primary Examiner* — Thien M Le
(74) *Attorney, Agent, or Firm* — WPAT, PC

(57) ABSTRACT

A point-of-sale system with a replaceable printer is provided. The point-of-sale system includes a main body and the printer. The main body is electrically connected with a display device. The main body includes a main circuit board, an accommodation member and a positioning structure. The printer includes a detaching element and a position-limiting element, which are connected with each other. The printer is disposed within the accommodation member of the main body and electrically connected with the main circuit board. The position-limiting element of the printer is aligned with the positioning structure of the main body to limit the position of the printer in the accommodation member of the main body. The printer is detached from the main body through the detaching element. Consequently, the printer can be easily detached from the main body through a single keypress action.

14 Claims, 9 Drawing Sheets

US 9,721,440 B1

POINT-OF-SALE SYSTEM WITH REPLACEABLE PRINTER

FIELD OF THE INVENTION

The present invention relates to a point-of-sale system, and more particularly to a point-of-sale system with a replaceable printer.

BACKGROUND OF THE INVENTION

With the popularity of the selling system in business, a point-of-sale (POS) system is used in various stores or business places in order to manage goods purchase, goods sale, good return, fees and other information. For example, the POS system usually comprises a host, a monitor, a printer, and any other appropriate electronic device. In case that the POS system has a breakdown and any electronic device of the POS system needs to be replaced, the user usually notifies the engineer of the original equipment manufacturer to replace the components of the electronic device.

Generally, the POS system is an important business tool in the store or the business place. If any electronic device of the POS system is abnormal and the abnormal situation fails to be eliminated in advance or immediately, the selling process is not smooth. Under this circumstance, the business loss increases.

A conventional repair and maintenance process of the POS system will be illustrated as follows. Firstly, the maintenance worker goes to the installation site of the POS system to check and maintain the electronic devices of the POS system. Then, the entire of the POS system is packed and sent to the factory of the original equipment manufacturer. After the POS system is sent to the original equipment manufacturer, the POS system is disassembled and repaired. After the damaged electronic device is replaced with a new one, the entire of the POS system is packed again and sent back to the store or business place.

The conventional repair and maintenance process of the POS system is time-consuming and increases the cost and complexity of maintaining and transporting the POS system.

For overcoming the above drawbacks, there is a need of providing an improved POS system. When one of the electronic devices of the POS system is damaged, the damaged electronic device can be replaced immediately.

SUMMARY OF THE INVENTION

For overcoming the drawbacks of the conventional technologies, the present invention provides a point-of-sale system with a replaceable printer.

In accordance with an aspect of the present invention, there is provided a point-of-sale system with a replaceable printer. The point-of-sale system at least includes a main body and the printer. The main body includes a main circuit board, an accommodation member and at least one positioning structure. The main circuit board is electrically connected with a display device. The printer is disposed within the accommodation member and electrically connected with the main circuit board. The printer includes at least one position-limiting element and a detaching element. The position-limiting element is aligned with the corresponding positioning structure to limit a position of the printer in the accommodation member. The detaching element is connected with the position-limiting element to detach the printer from the main body.

In an embodiment, a first end of the position-limiting element corresponds to an end of the positioning structure, a second end of the position-limiting element has a guiding surface, the detaching element comprises a force-exerted surface and a pushing part, and the pushing part is contacted with the guiding surface. When an external force is applied to the force-exerted surface, the pushing part is moved in a guiding direction of the guiding surface to push the position-limiting element, so that the position-limiting element is disengaged from the positioning structure.

In an embodiment, the positioning structure is a fixing hole, and the first end of the position-limiting element is protruded through the fixing hole. When the position-limiting element is pushed by the pushing part, a moving distance of the position-limiting element is larger than or equal to a length of a portion of the position-limiting element that is protruded through the fixing hole.

In an embodiment, the positioning structure is a stopper. The first end of the position-limiting element is stopped by the stopper, so that the printer is positioned in the accommodation member.

In an embodiment, the detaching element further includes a pressing block and a push rod. The force-exerted surface is located at a specified side of the pressing block. The pushing part is located at a first end of the push rod. A second end of the push rod is connected with the pressing block. While the pressing block is moved in response to the external force applied to the force-exerted surface, the pushing part of the push rod is correspondingly moved in the guiding direction of the guiding surface.

In an embodiment, the printer further includes a casing, and the push rod further includes an elastic element. The elastic element is connected with the casing. The push rod is returned to an original position through the elastic element.

In an embodiment, the pushing part further includes a bulge, and the printer includes an ejection hole corresponding to the bulge. While the push rod is moved, the push rod is moved in the guiding direction of the guiding surface, and the bulge is protruded through the ejection hole to push an inner surface of the main body, so that the printer is detached from the main body.

In an embodiment, the push rod further comprises a guiding slot, and a movable range of the push rod is limited by the guiding slot.

In an embodiment, the guiding surface of the position-limiting element is a slant surface. While the push rod is pushed by the pressing block, the pushing part of the push rod is moved along the slant surface to push the position-limiting element.

In an embodiment, the at least one positioning structure of the main body includes two positioning structures, and the at least one position-limiting element of the printer includes two position-limiting elements corresponding to the two positioning structures. The two positioning structures are fixing holes. First ends of the two position-limiting elements are protruded through the corresponding fixing holes. Second ends of the two position-limiting elements have corresponding guiding surfaces. The pushing part of the push rod is arranged between the guiding surfaces of the two position-limiting elements. While the push rod is moved, the pushing part is moved in guiding directions of the guiding surfaces to push the two position-limiting elements, so that the printer is detached from the main body.

In accordance with an aspect of the present invention, there is provided a point-of-sale system with a replaceable printer. The point-of-sale system at least includes a main body, the printer and a detaching element. The main body includes a main circuit board, an accommodation member and a first coupling means. The printer is disposed within the accommodation member and electrically connected with the main circuit board. The printer includes a second coupling means. When the second coupling means is coupled with the first coupling means, a position of the printer is limited in the accommodation member. The detaching element is connected with the second coupling means so as to detach the printer from the main body.

In an embodiment, the main body and the printer have corresponding electric connectors, and the printer is hot-pluggable into the main body through the electric connectors.

In an embodiment, the detaching element includes a force-exerted surface and a pushing part. The pushing part is contacted with the second coupling means. When an external force is applied to the force-exerted surface, the pushing part is moved to push the position-limiting element, so that the second coupling means is disengaged from the first coupling means.

In an embodiment, the detaching element further includes a pressing block and a push rod. The force-exerted surface is located at a specified side of the pressing block. The pushing part is located at a first end of the push rod. A second end of the push rod is connected with the pressing block. While the pressing block is moved in response to the external force applied to the force-exerted surface, the pushing part of the push rod is correspondingly moved to push the second coupling means.

In an embodiment, the printer further includes a casing, and the push rod further includes an elastic element. The elastic element is connected with the casing, and the push rod is returned to an original position through the elastic element.

In an embodiment, the pushing part further includes a bulge, and the printer includes an ejection hole corresponding to the bulge. While the push rod is moved, the bulge of the pushing part is protruded through the ejection hole to push an inner surface of the main body, so that the printer is detached from the main body.

In an embodiment, the point-of-sale system further includes a display device. The display device is fixedly or detachably installed on the main body, and the display device is electrically connected with the main control board and the printer.

From the above descriptions, the present invention provides the POS system with a replaceable printer. The structure of the replaceable printer is improved. That is, the detaching element, the position-limiting element and the positioning structure are cooperated to achieve the function of ejecting the printer through a single keypress action. Moreover, the POS system is more user-friendly. Since the printer of the POS system is replaceable, the entire of the printer can be replaced in the repair and maintenance process. Consequently, the operations of the POS system are not interrupted, and the business of the store is not adversely affected. Moreover, since the structure of the printer is improved, the printer can be easily detached from the main body through the single keypress action. In other words, the printer can be replaced in a time-saving, cost-effective and easy-to-use manner.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides a point-of-sale system with a replaceable printer. The present invention will now be described more specifically with reference to the following embodiments and accompanying drawings.

Figure 1:
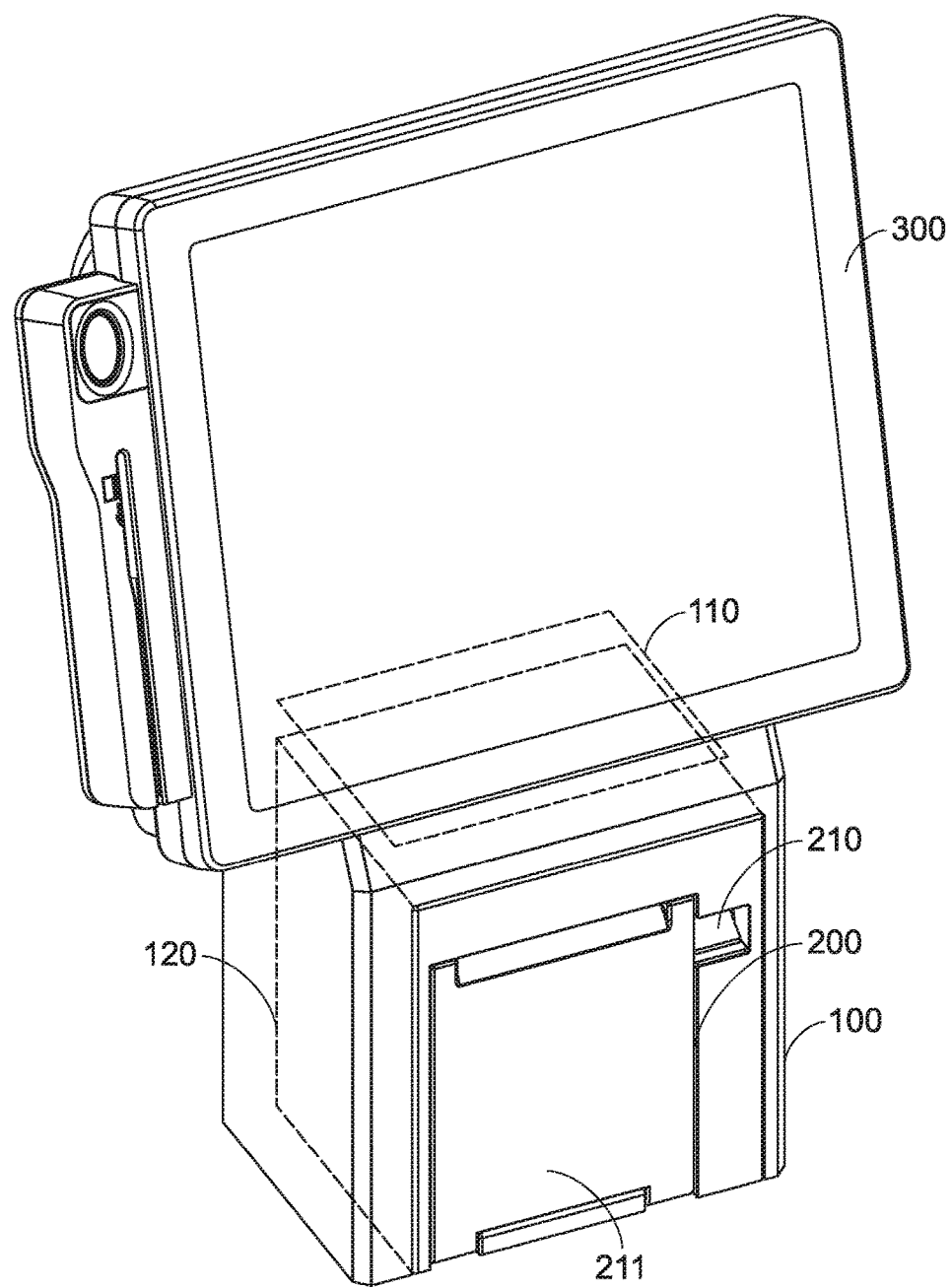
FIG. 1 is a schematic perspective view illustrating the outer appearance of a point-of-sale system with a replaceable printer according to an embodiment of the present invention.

FIG. 1 is a schematic perspective view illustrating the outer appearance of a point-of-sale system with a replaceable printer according to an embodiment of the present invention. As shown in FIG. 1, the point-of-sale system comprises a main body 100, a printer 200 and a display device 300. The main body 100 comprises a main control board 110 and an accommodation member 120. The printer 200 comprises a door button 210 and a door plate 211. The door plate 211 can be opened through the door button 210.

The printer 200 is disposed within the accommodation member 120, and electrically connected with the main control board 110 of the main body 100. The display device 200 is detachably or fixedly connected with the main body 100. Moreover, the display device 300 is electrically connected with the main control board 110 of the main body 100 and the printer 200.

An example of the main control board 110 is a motherboard. The main control board 110 is used for controlling the electronic devices that are electrically connected with the main body 100. In this embodiment, the electronic devices of the POS system include the display device 300 and the printer 200. It is noted that the examples of the electronic devices are not restricted. When the door plate 211 of the printer 200 is opened through the door button 210, the consumable materials of the printer 200 can be replaced with new ones. For example, the consumable materials of the printer 200 include thermal paper rolls, ink or ink strip.

Figure 2A:
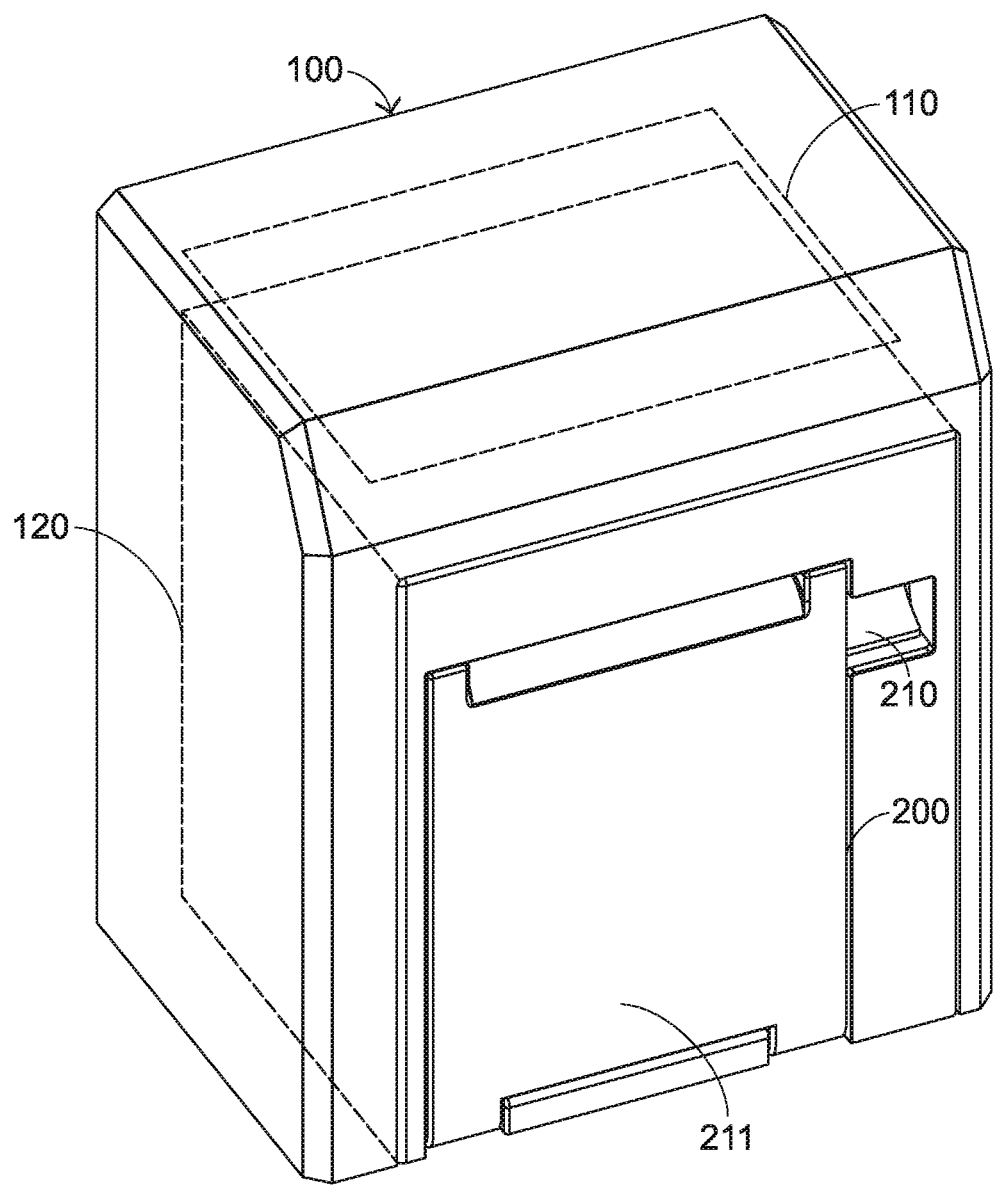
FIG. 2A is a schematic perspective view illustrating the outward appearance of the main body of the point-of-sale system according to the embodiment of the present invention.
Figure 2B:
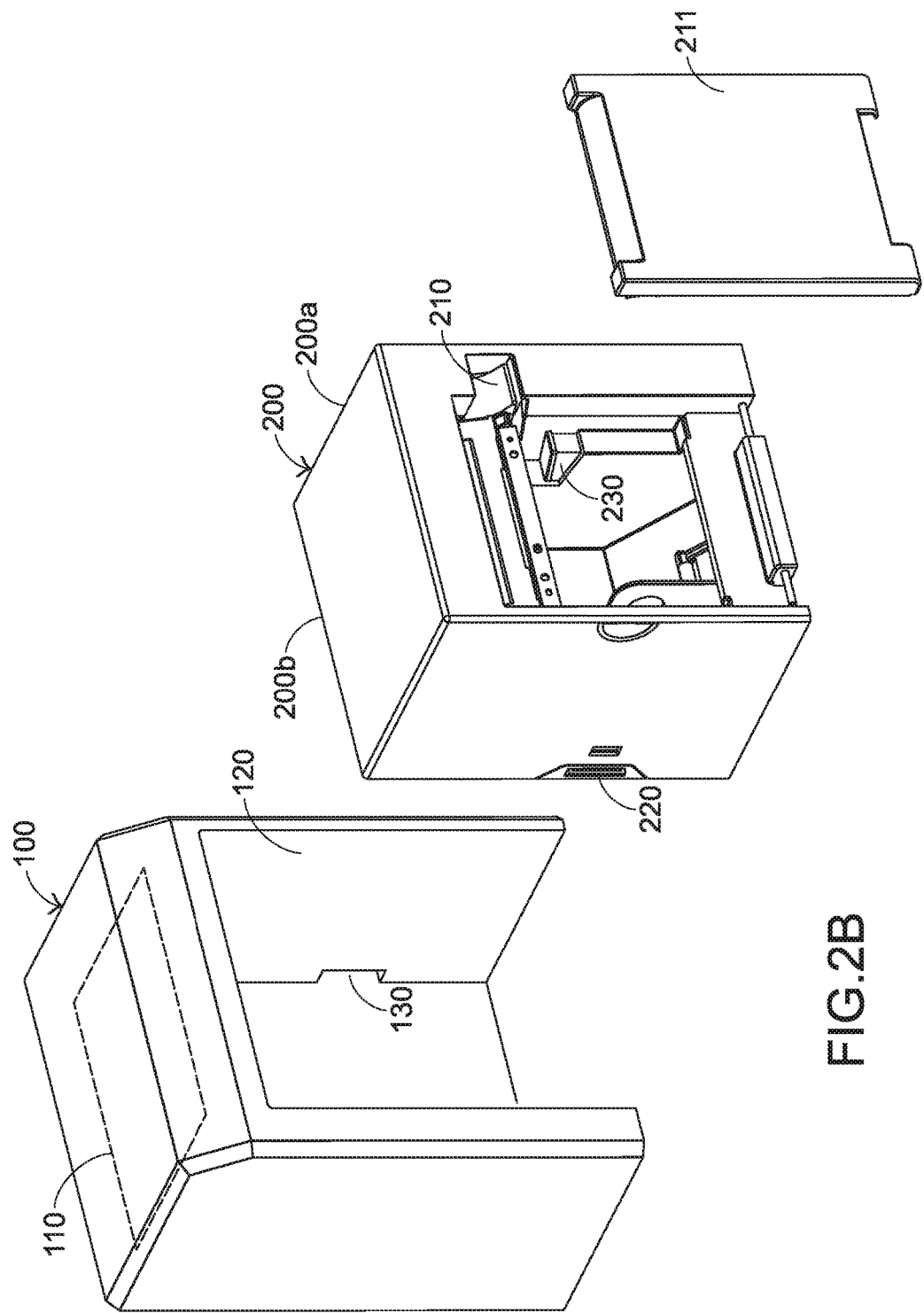
FIG. 2B is a schematic exploded view illustrating the main body and the printer of the point-of-sale system according to the embodiment of the present invention.
Figure 2C:
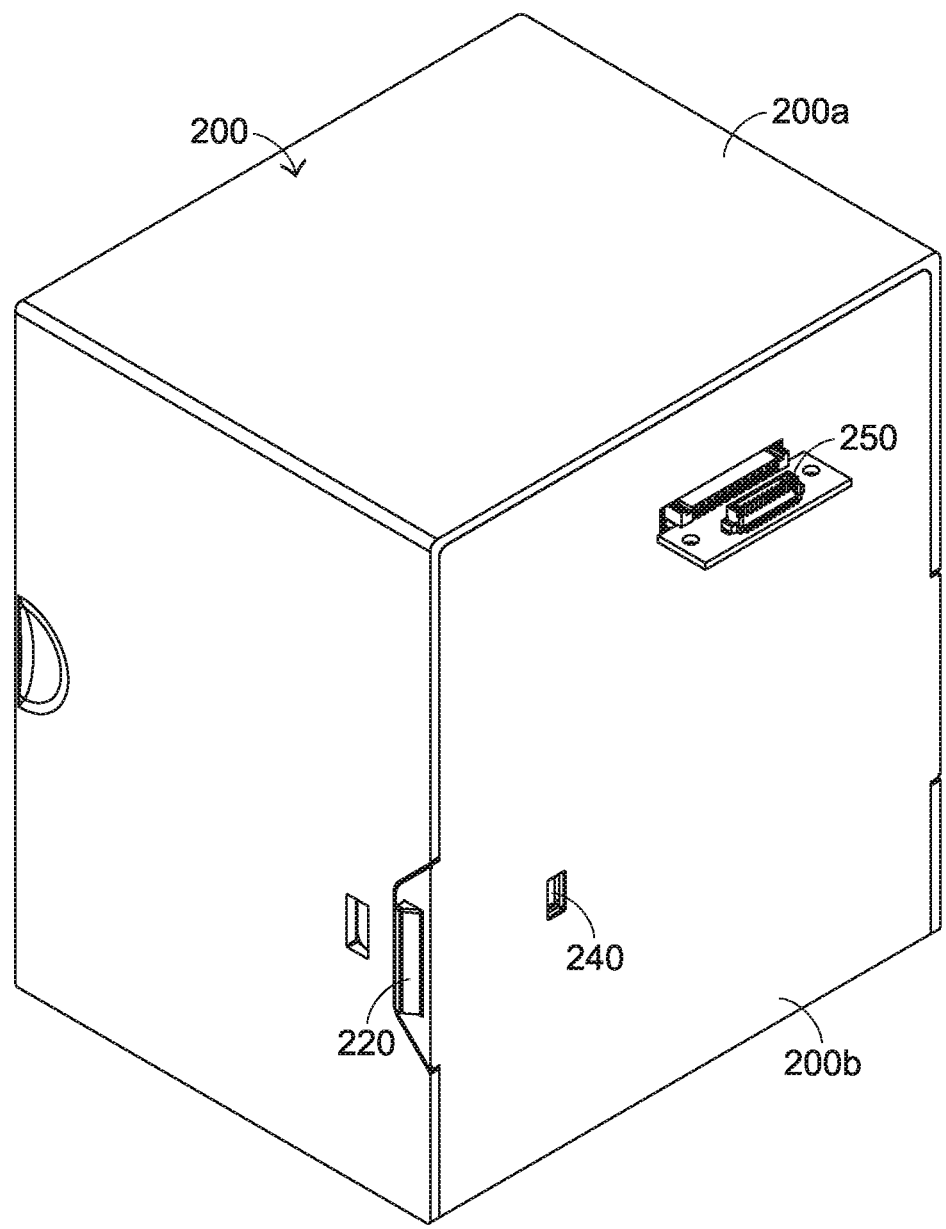
FIG. 2C is a schematic perspective view illustrating the printer of the point-of-sale system of FIG. 2A and taken along another viewpoint.

The structure of the point-of-sale system with the replaceable printer will be illustrated as follows. FIG. 2A is a schematic perspective view illustrating the outward appearance of the main body of the point-of-sale system according to the embodiment of the present invention. FIG. 2B is a schematic exploded view illustrating the main body and the printer of the point-of-sale system according to the embodiment of the present invention. FIG. 2C is a schematic perspective view illustrating the printer of the point-of-sale system of FIG. 2A and taken along another viewpoint. Please refer to FIGS. 2A, 2B and 2C. The main body 100 further comprises a positioning structure 130. The positioning structure 130 is formed in an inner surface of the accommodation member 120. The printer 200 comprises a casing 200a, a backside plate 200b, a position-limiting element 220, a detaching element 230, an ejection hole 240 and an electric connector 250. The casing 200a is an outer shell of the printer 200. The backside plate 200b is opposed to the door plate 211. The position-limiting element 220 corresponds to the positioning structure 130 of the accommodation member 120. The detaching element 230 is connected with the position-limiting element 220. Through the detaching element 230, the entire of the printer 200 is detached from the main body 100. The ejection hole 240 and the electric connector 250 are located at the backside plate 200b. The electric connector 250 is hot-pluggable to the printer 200 and the main control board 110.

The operations of the point-of-sale system with the replaceable printer will be illustrated as follows. Please refer to the structure of the point-of-sale system as shown in FIGS. 2A, 2B and 2C. Firstly, the printer 200 is placed within the main body 100, wherein the backside plate 200b of the printer 200 faces the accommodation member 120. Through the electric connector 250 at the backside plate 200b, the printer 200 is hot-plugged into the main control board 110 of the main body 100. The position-limiting element 220 on the casing 200a of the printer 200 is engaged with the positioning structure 130 of the accommodation member 120. Consequently, the printer 200 is positioned in the accommodation member 120. As shown in FIG. 2A, after the printer 200 is positioned in the accommodation member 120, the door plate 211 is located beside an outer periphery of the main body 100. When an external force is applied to the door button 210, the door plate 211 is opened. Then, an external force is applied to the detaching element 230 to press or push the detaching element 230. The position-limiting element 220 is linked and pushed by the detaching element 230. Consequently, the position-limiting element 220 is disengaged from the positioning structure 130. Under this circumstance, the printer 200 is detached from the main body 100 (see FIG. 2B). The relationship between the detaching element 230, the position-limiting element 220 and the positioning structure 130 will be described as follows.

The detailed structures of the detaching element 230, the position-limiting element 220 and the positioning structure 130 and the connecting relationships between these three components will be illustrated with reference to FIGS. 3A-3D. In this embodiment, the POS system comprises two position-limiting elements 220 and 221 and two positioning structures. It is noted that the number of the position-limiting elements and the number of the positioning structures are not restricted. In some embodiments, the POS system comprises a single position-limiting element and a single positioning structure.

Figure 3A:
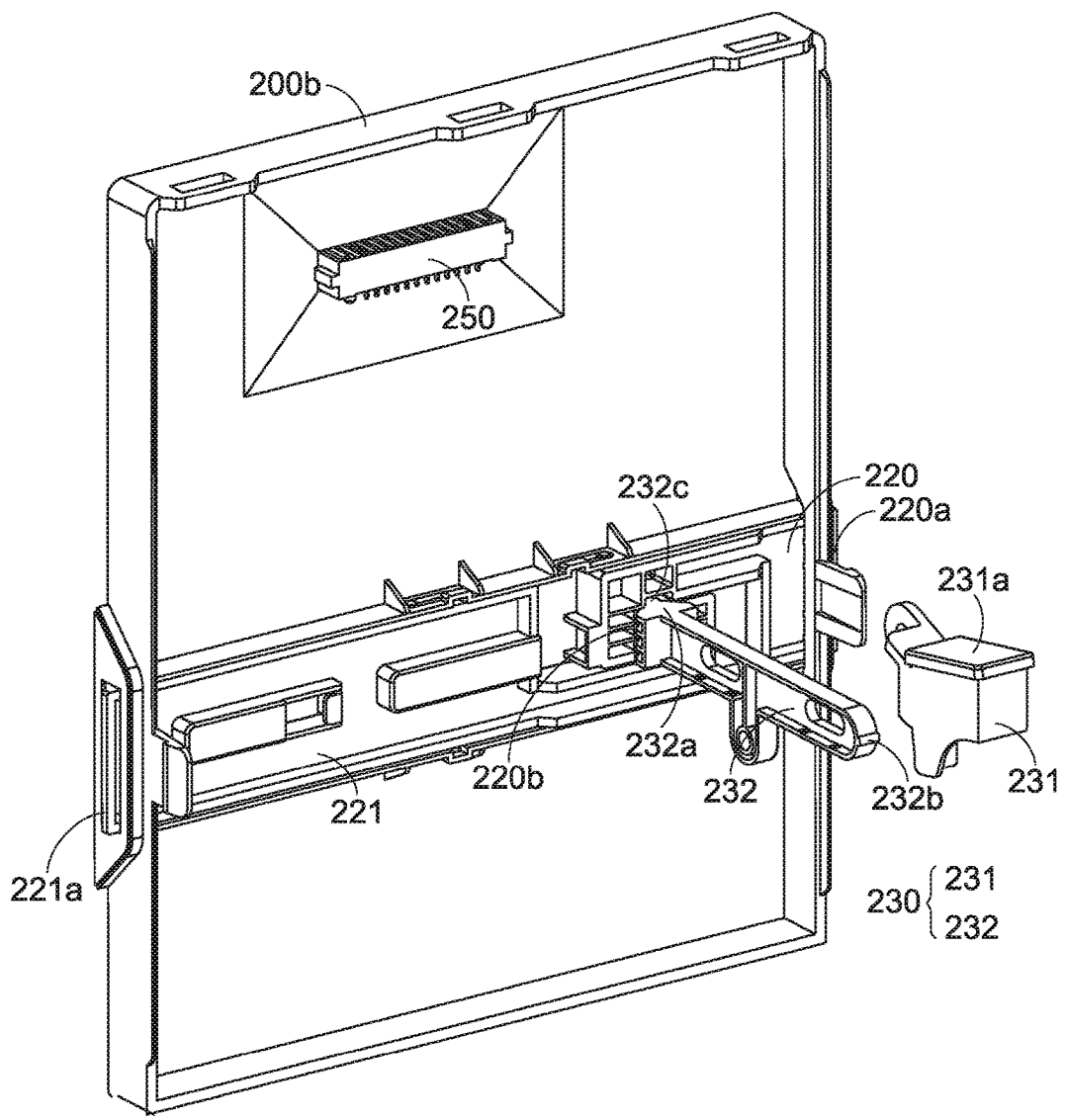
FIG. 3A is a schematic perspective view illustrating the relationship between the backside plate, the position-limiting element and the detaching element of the point-of-sale system according to the embodiment of the present invention.
Figure 3B:
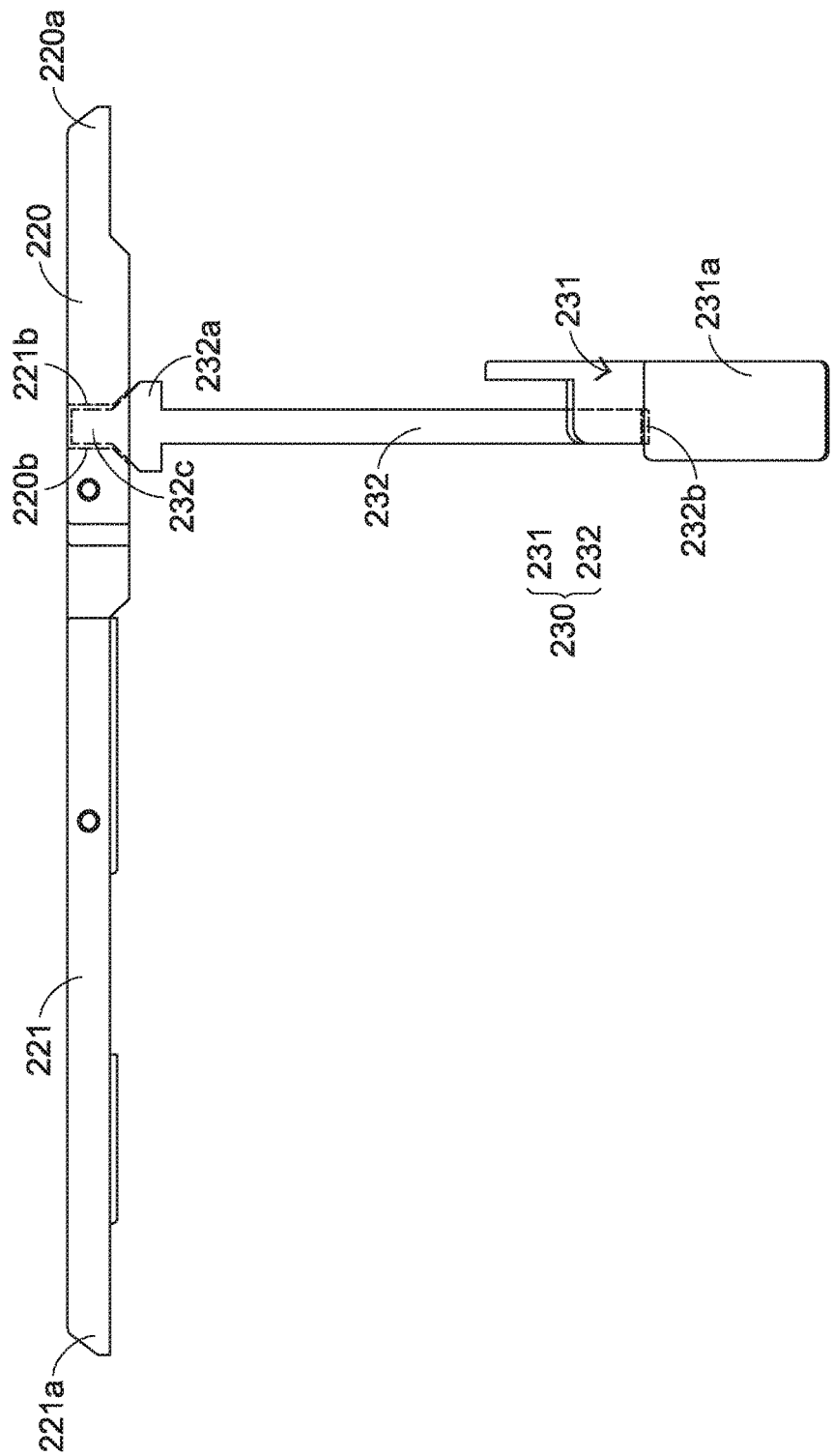
FIG. 3B is a schematic top view illustrating the relationship between the position-limiting element and the detaching element as shown in FIG. 3A.
Figure 3C:
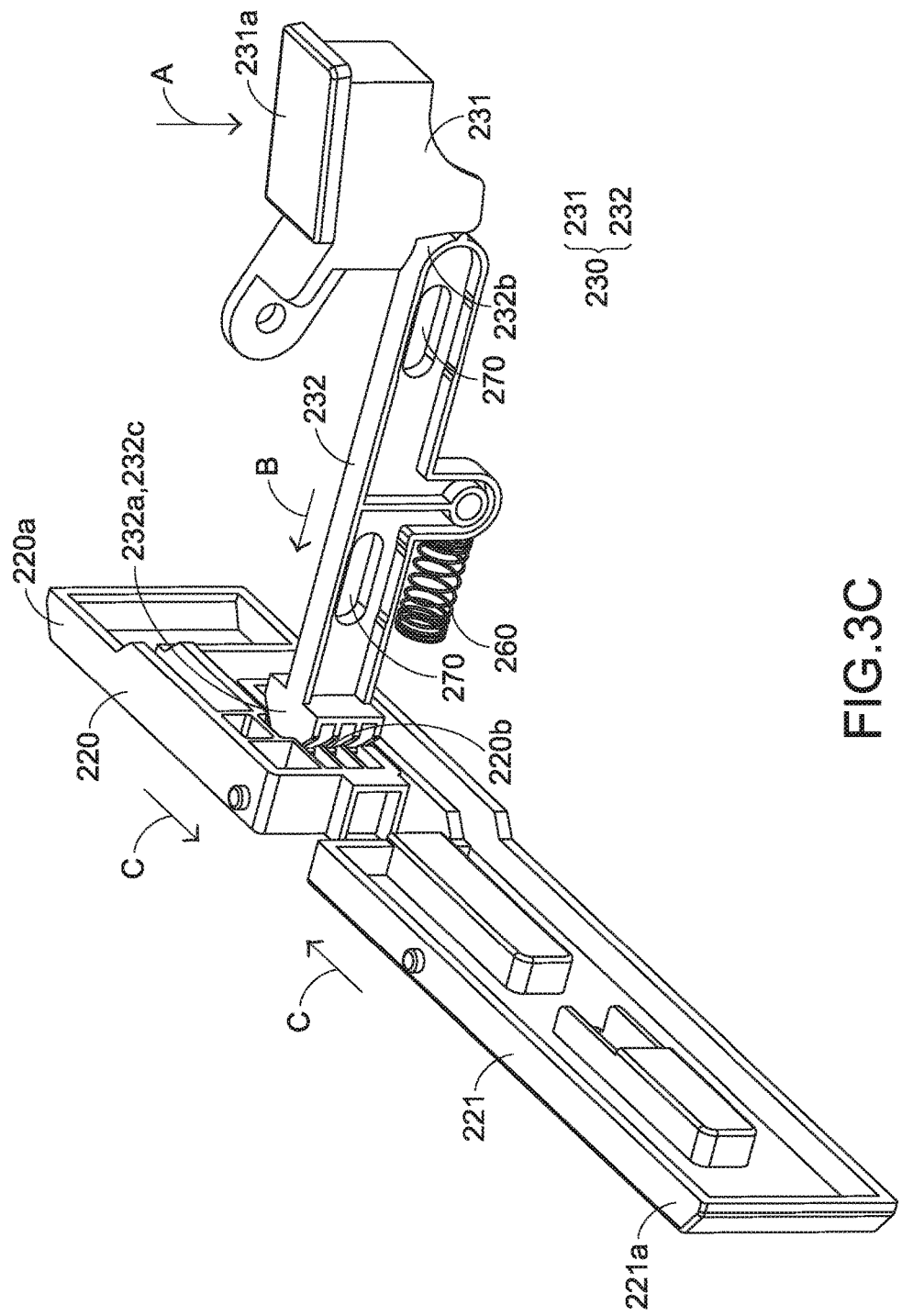
FIG. 3C is a schematic perspective view illustrating the actions of the position-limiting element and the detaching element as shown in FIG. 3A.
Figure 3D:
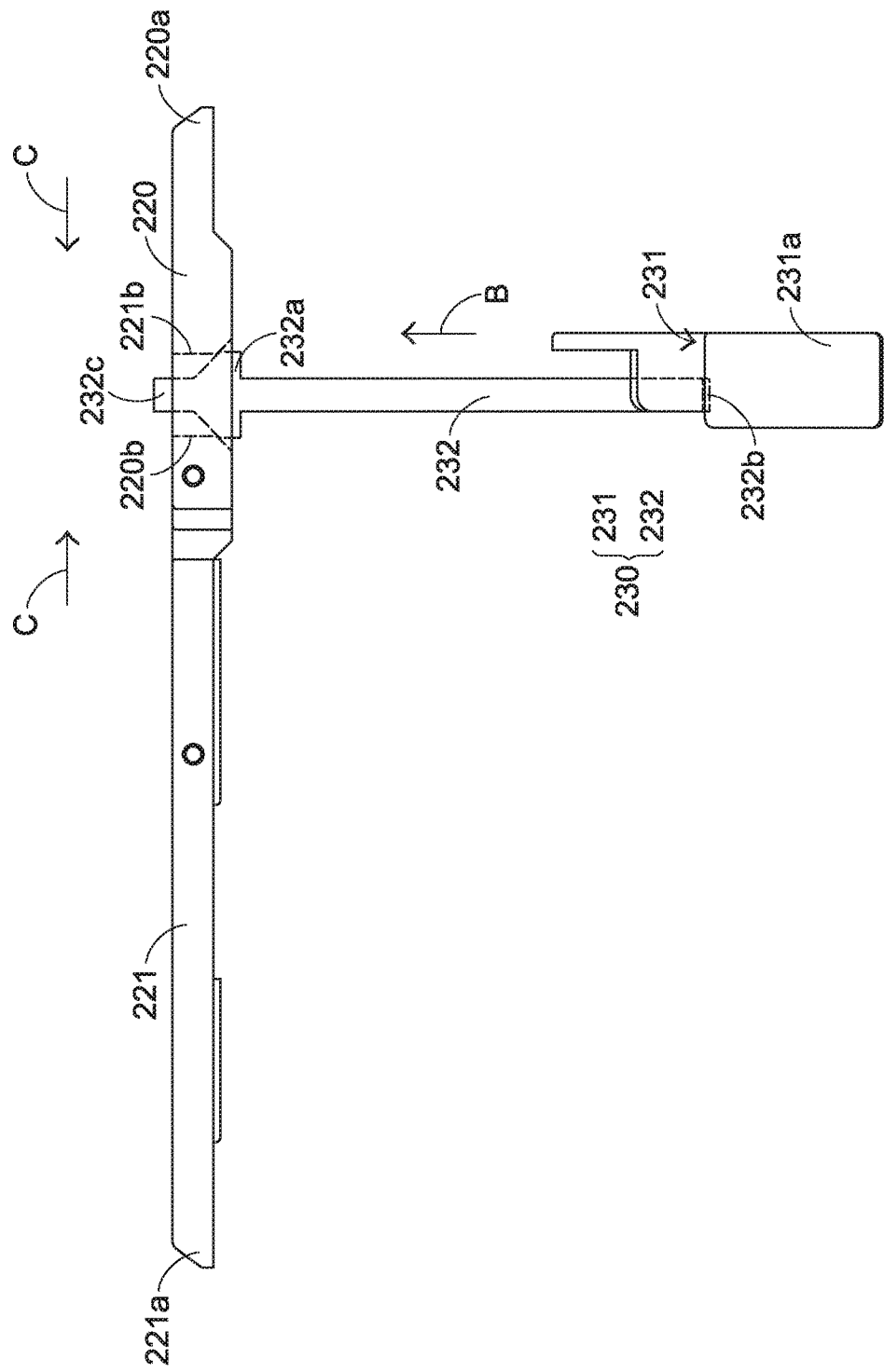
FIG. 3D is a schematic top view illustrating the actions of the position-limiting element and the detaching element as shown in FIG. 3A.

As shown in FIGS. 3A and 3B, the detaching element 230 comprises a pressing block 231 and a push rod 232. The pressing block 231 has a force-exerted surface 231a. The push rod 232 has a rod body with two ends 232a and 232b. The end 232b of the push rod 232 is connected with the pressing block 231. The end 232a is a pushing part. The pushing part 232a has a bulge 232c. A first end 220a of the position-limiting element 220 and a first end 221a of the position-limiting element 221 are received within the corresponding positioning structures 130 of the accommodation member 120. Consequently, the position of the printer 200 is limited. A second end 220b of the position-limiting element 220 has a guiding surface 220b, and a second end 221b of the position-limiting element 221 has a guiding surface 221b. The guiding surfaces 220b and 221b are connected with the pushing part 232a of the push rod 232. As mentioned above, the positioning structures 130 are aligned with the position-limiting elements 220 and 221. Consequently, the printer 200 is positioned in the accommodation member 120 of the main body 100. Preferably but not exclusively, the positioning structure 130 is a fixing hole 131 or a stopper 132, which will be described later in FIGS. 4A and 4B.

The processes of combining and detaching the detaching element 230, the two position-limiting elements 220, 221 and the two positioning structures 130 can be clearly understood from the above descriptions. Please also refer to FIGS. 3C and 3D. When an external force is applied to the force-exerted surface 231a of the pressing block 231, the pressing block 231 is moved downwardly in a pressing direction A so as to push the end 232b of the push rod 232. Moreover, the pushing part 232a at the second end of the push rod 232 is moved in a pushing direction B. Consequently, the bulge 232c of the push rod 232 is moved in the pushing direction B to push the guiding surface 220b of the position-limiting element 220 and the guiding surface 221b of the position-limiting element 221. As the guiding surfaces 220b and 221b are pushed by the bulge 232c, the two position-limiting elements 220 and 221 that are opposed to each other are moved in the guiding directions C of the guiding surfaces 220b and 221b. Consequently, the two position-limiting elements 220 and 221 are retracted into the printer 200 in the guiding directions C of the guiding surfaces 220b and 221b. Under this circumstance, the two position-limiting elements 220 and 221 are disengaged from the corresponding positioning structures 130 of the main body 100. In this embodiment, the guiding surfaces 220b and 221b are slant surfaces. Consequently, the two position-limiting elements 220 and 221 are moved in the guiding directions C of the slant surfaces. The guiding directions C of the slant surfaces are specially designed such that the two position-limiting elements 220 and 221 are moved inwardly and retracted into the printer 200. It is noted that the designs of the guiding directions C of the slant surfaces are not restricted. For example, the guiding surfaces 220b and 221b of the two position-limiting elements 220 and 221 are designed according to the structures of the two positioning structures 130.

Please refer to FIGS. 3C and 3D again. The POS system further comprises an elastic element 260 and at least one guiding slot 270. An end of the elastic element 260 is connected with the casing 200a (not shown). The other end of the elastic element 260 is connected with the push rod 232. Due to the elastic element 260, the push rod 232 can be returned to its original position and thus the pressing block 231 can be returned to its original position. The casing 200a has at least one protrusion structure (not shown) corresponding to the at least one guiding slot 270. The protrusion structure is penetrated through the corresponding guiding slot 270, and movable between two distal ends of the corresponding guiding slot 270. Consequently, the movable range of the push rod 232 is limited. It is noted that the example of the guiding slot 270 may be varied according to the practical requirements.

In some other embodiments, the two positioning structures 130 are inserted into the printer 200 to limit the position of the printer 200 in the accommodation member 120. The guiding directions C of the guiding surfaces 220b and 221b of the two position-limiting elements 220 and 221 are specially designed such that the two position-limiting elements 220 and 221 are moved outwardly. The two positioning structures 130 are pushed out of the printer 200 by the first end 220a of the position-limiting element 220 and the first end 221a of the position-limiting element 221. Consequently, the printer 200 is no longer positioned in the accommodation member 120.

As mentioned above, the casing 200b of the printer 200 has the ejection hole 240 (see FIG. 2C). The bulge 232c of the push rod 232 is aligned with the ejection hole 240. As the push rod 232 is moved in the pushing direction B, the bulge 232c of the pushing part 232a is protruded through the ejection hole 240. When the bulge 232c of the pushing part 232a is protruded through the ejection hole 240, the inner surface of the accommodation member 120 is pushed by the bulge 232c. Consequently, a counterforce is generated. In response to the counterforce, the entire of the printer 200 is ejected from the accommodation member 120 in the direction of the counterforce. That is, through the single keypress action on the detaching element 230, the printer 200 can be detached from the main body. Consequently, the POS system of the present invention has the function of ejecting the printer 200 through the single keypress action in order for replacing the printer 200.

Figure 4A:
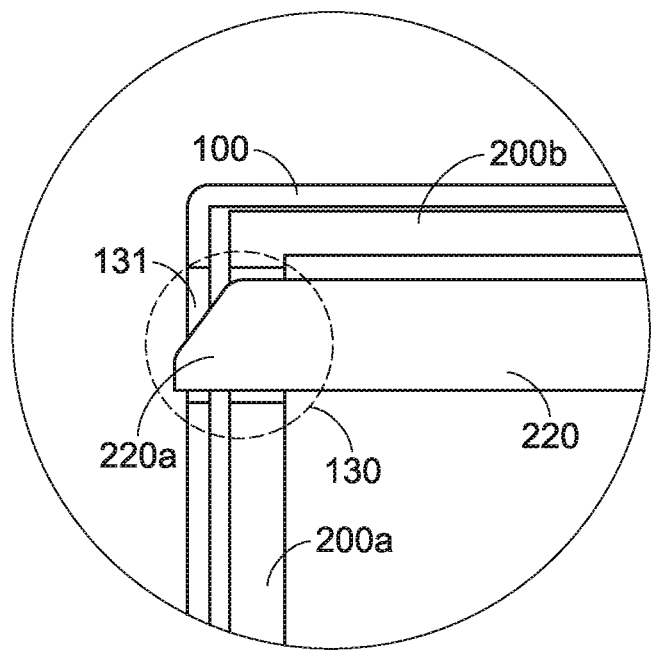
FIG. 4A is a schematic enlarged fragmentary side view illustrating the position-limiting element and the corresponding positioning structure as shown in FIG. 3A.
Figure 4B:
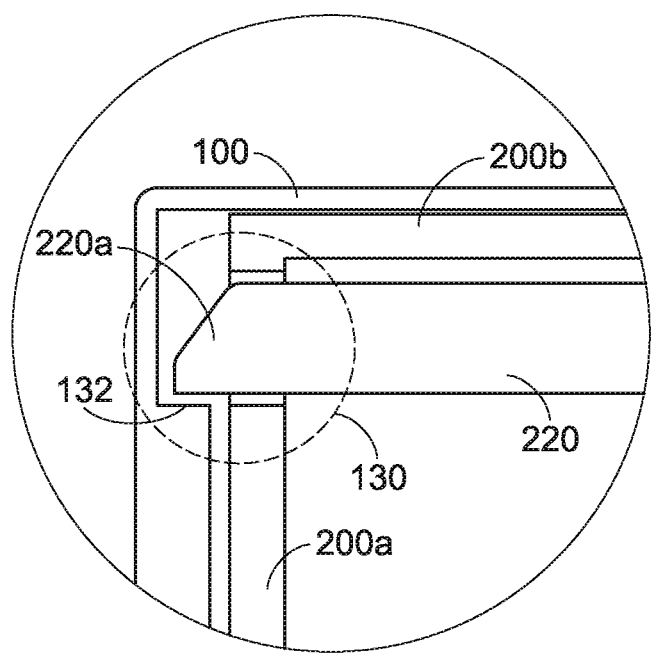
FIG. 4B is a schematic enlarged fragmentary side view illustrating the position-limiting element and the corresponding positioning structure of a POS system according to another embodiment of the present invention.

FIG. 4A is a schematic enlarged fragmentary side view illustrating the position-limiting element and the corresponding positioning structure as shown in FIG. 3A. FIG. 4B is a schematic enlarged fragmentary side view illustrating the position-limiting element and the corresponding positioning structure of a POS system according to another embodiment of the present invention. As mentioned above, an example of the positioning structure 130 includes a fixing hole 131, a stopper 132 or any other appropriate structure.

In the embodiment of FIG. 4A, the positioning structure 130 includes the fixing hole 131. When the first end 220a of the position-limiting element 220 is protruded out of the casing 200a of the printer 200 and inserted into the fixing hole 131 of the main body 100, the printer 200 is fixed in the main body 100. Consequently, the function of limiting the position of the printer 200 is achieved. Preferably but not exclusively, the first end 220a of the position-limiting element 220 is protruded through the fixing hole 131. When the position-limiting element 220 is pushed by the pushing part 232a, a moving distance of the position-limiting element 220 is larger than or equal to a length of a portion of the position-limiting element 220 that is protruded through the fixing hole 131.

In the embodiment of FIG. 4B, the positioning structure 130 is the stopper 132. The stopper 132 is formed in an inner surface of the main body 100. When the first end 220a of the position-limiting element 220 is protruded out of the casing 200a of the printer 200 and connected with the stopper 132 in the inner surface of the main body 100, first end 220a of the position-limiting element 220 is stopped by the stopper 132 and the printer 200 is fixed in the main body 100. Since the position-limiting element 220 is engaged with the positioning structure 130, the printer 200 is fixed in the accommodation member 120. The two examples of the positioning structure are presented herein for purpose of illustration and description only. That is, numerous modifications and alterations may be made while retaining the teachings of the invention.

As mentioned above, the conventional repair and maintenance process of the POS system is time consuming and increases the cost and complexity of maintaining and transporting the POS system. The POS system of the present invention is beneficial over the conventional POS system because the printer is capable of being replaced by the user and the POS system is easy to use.

From the above descriptions, the present invention provides the POS system with a replaceable printer. The structure of the replaceable printer is improved. That is, the detaching element, the position-limiting element and the positioning structure are cooperated to achieve the function of ejecting the printer through a single keypress action. Moreover, the POS system is more user-friendly. Since the printer of the POS system is replaceable, the entire of the printer can be replaced in the repair and maintenance process. That is, the operations of the POS system are not interrupted, and the business of the store is not adversely affected. Moreover, since the structure of the printer is improved, the printer can be easily detached from the main body through the single keypress action. In other words, the printer can be replaced in a time-saving, cost-effective and easy-to-use manner.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the brodest interpretation so as to encompass all such modifications and similar structures.

What is claimed is:

1. A point-of-sale system with a replaceable printer, the point-of-sale system at least comprising:
a main body comprising a main circuit board, an accommodation member and at least one positioning structure, wherein the main circuit board is electrically connected with a display device; and
the printer disposed within the accommodation member and electrically connected with the main circuit board, and comprising at least one position-limiting element for engaging with the positioning structure of the main body to limit a position of the printer in the accommodation member, and a detaching element for disengaging the position-limiting element from the positioning structure of the main body, thereby detaching the printer from the main body,
wherein the detaching element comprises a pressing block and a push rod, and when an external force is exerted on the pressing block in a first direction, the push rod is transmitted to move in a second direction different from the first direction and transmit the position-limiting element to move in a third direction different from the second direction, thereby disengaging the position-limiting element from the positioning structure of the main body.

2. The point-of-sale system according to claim 1, wherein a first end of the position-limiting element is coupled to an end of the positioning structure, and a second end of the position-limiting element, is coupled to the push rod of the detaching element, and as the pressing block is pushed down, the push rod is pushed by the pressing block to move toward the position-limiting element while pushing the position-limiting element to retract and detach from the positioning structure of the main body.

3. The point-of-sale system according to claim 1, wherein the positioning structure is a fixing hole, and the first end of the position-limiting element penetrates through the fixing hole, wherein when the position-limiting element is pushed, a moving distance of the position-limiting element is larger than or equal to a length of a portion of the position-limiting element that protrudes from the fixing hole.

4. The point-of-sale system according to claim 1, wherein the positioning structure is a stopper, and the first end of the position-limiting element is stopped by the stopper, so that the printer is positioned in the accommodation member.

5. The point-of-sale system according to claim 1, wherein the printer further comprises a casing, and the push rod further comprises an elastic element, wherein the elastic element is connected with the casing, and the push rod is returned to an original position through the elastic element.

6. The point-of-sale system according to claim 1, wherein the push rod further comprises a bulge, and the printer comprises an ejection hole corresponding to the bulge, wherein as the pressing block is pushed down, the bulge is pushed to move into the ejection hole while pushing a surface of the position-limiting element to retract and detach from the positioning structure of the main body.

7. The point-of-sale system according to claim 6, wherein the surface of the position-limiting element pushed by the push rod is a slant surface, and the push rod is pushed by the pressing block to move along the slant surface of the position-limiting element while pushing the slant surface of the position-limiting element to retract and detach from the positioning structure of the main body.

8. The point-of-sale system according to claim 1, wherein the push rod further comprises a guiding slot, and a movable range of the push rod is limited by the guiding slot.

9. The point-of-sale system according to claim 1, wherein the at least one positioning structure of the main body comprises two positioning structures, and the at least one position-limiting element of the printer comprises two position-limiting elements corresponding to the two positioning structures, wherein the two positioning structures are disposed at opposite sides of the two position-limiting elements, and the two position-limiting elements are simultaneously pushed by the push rod to move in opposite directions so as to retract and detach from the corresponding positioning structures of the main body.

10. A point-of-sale system with a replaceable printer, the point-of-sale system at least comprising:
  a main body comprising a main circuit board, an accommodation member and a first coupling means;
  the printer disposed within the accommodation member and electrically connected with the main circuit board, and comprising a second coupling means, wherein when the second coupling means is coupled with the first coupling means, a position of the printer is limited in the accommodation member; and
  a detaching element connected with the second coupling means for detaching the printer from the main body,
  wherein the detaching element comprises a pressing block and a push rod, and when an external force is exerted on the pressing block in a first direction, the push rod is transmitted to move in a second direction different from the first direction and transmit the position-limiting element to move in a third direction different from the second direction, thereby disengaging the position-limiting element from the positioning structure of the main body.

11. The point-of-sale system according to claim 10, wherein the main body and the printer have corresponding electric connectors, and the printer is hot-pluggable into the main body through the electric connectors.

12. The point-of-sale system according to claim 10, wherein the printer further comprises a casing, and the push rod further comprises an elastic element, wherein the elastic element is connected with the casing, and the push rod is returned to an original position through the elastic element.

13. The point-of-sale system according to claim 10, wherein the pushing part further comprises a bulge, and the printer comprises an ejection hole corresponding to the bulge, wherein as the pressing block is pushed down, the bulge is pushed to move into the ejection hole while pushing a surface of the position-limiting element to retract and detach from the positioning structure of the main body.

14. The point-of-sale system according to claim 10, further comprising a display device, wherein the display device is fixedly or detachably installed on the main body, and the display device is electrically connected with the main control board and the printer.

* * * * *